(12) United States Patent
Xu

(10) Patent No.: US 12,712,645 B2
(45) Date of Patent: Aug. 18, 2026

(54) METHOD AND NETWORK DEVICE FOR DETERMINING CAUSES OF NETWORK SLICE PERFORMANCE DEGRADATION IN AN OPEN RADIO ACCESS NETWORK, O-RAN

(71) Applicant: NEC Laboratories Europe GmbH, Heidelberg (DE)

(72) Inventor: Zhao Xu, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 363 days.

(21) Appl. No.: 18/554,634

(22) PCT Filed: Apr. 19, 2021

(86) PCT No.: PCT/EP2021/060085
§ 371 (c)(1),
(2) Date: Oct. 10, 2023

(87) PCT Pub. No.: WO2022/223094
PCT Pub. Date: Oct. 27, 2022

(65) Prior Publication Data

US 2024/0121017 A1 Apr. 11, 2024

(51) Int. Cl.
*H04L 12/00* (2006.01)
*H04B 17/17* (2015.01)
(Continued)

(52) U.S. Cl.
CPC ........... *H04B 17/17* (2015.01); *H04L 41/145* (2013.01); *H04L 41/16* (2013.01); *H04L 41/5025* (2013.01); *H04W 24/02* (2013.01)

(58) Field of Classification Search
CPC ....... H04B 17/17; H04L 41/145; H04L 41/16; H04L 41/5025; H04L 41/0636;
(Continued)

(56) References Cited

U.S. PATENT DOCUMENTS 9,900,790 B1 * 2/2018 Sheen ................. H04L 41/5009
10,924,330 B2 * 2/2021 Sharma ................. H04W 24/04
(Continued)

FOREIGN PATENT DOCUMENTS

CA 3121085 A1 * 12/2021 .......... G06F 11/3452

OTHER PUBLICATIONS

Baik, Seongbok et al.; "Machine Learning in 5G and Future Networks: Use Cases and Basic Requirements"; *Telecommunication Standardization Sector—Focus Group on Machine Learning for Future Networks Including 5G—Series ML5G-I-118-R7*; Feb. 18, 2019; pp. 1-42; vol. 1; ITU-T draft; Study Period 2017-2020; XP044262758; International Telecommunication Union; Geneva, Switzerland.

(Continued)

*Primary Examiner* — Frantz Coby
(74) *Attorney, Agent, or Firm* — Leydig, Voit & Mayer, Ltd.

(57) ABSTRACT

A method for determining causes of network slice performance degradation in an open radio access network under Central Unit-Distributed Unit (CU-DU) split, in a setup phase, obtains and aggregates telemetries that contain multivariate observations of DUs. High order features from correlations between multivariate observations across the DUs are extracted for a specific time slot, and a k-time slots ahead performance model is learned. For detection, the performance model forecasts network slice performance for new telemetries. If degradation is forecasted, performance models are sampled and impact scores are computed based on gradients of telemetries and high order features. Network slice entities related to telemetries with impact scores exceeding a threshold are identified as causes of degradation. The method can be applied to various use cases in artificial intelligence (AI) and machine learning (ML), such
(Continued)

as in medical/healthcare or autonomous driving, to optimize load distribution or support decision making.

16 Claims, 3 Drawing Sheets

(51) Int. Cl.
*H04L 41/14* (2022.01)
*H04L 41/16* (2022.01)
*H04L 41/5025* (2022.01)
*H04W 24/02* (2009.01)

(58) Field of Classification Search
CPC .... H04L 41/147; H04W 24/02; H04W 24/04; H04W 88/085
USPC .......................................................... 370/329
See application file for complete search history.

(56) References Cited

U.S. PATENT DOCUMENTS 11,122,467 B2* 9/2021 Singh ...................... H04L 41/22
2016/0127921 A1* 5/2016 Bhatia ................... H04M 15/58 455/422.1
2019/0059008 A1* 2/2019 Liu ....................... H04W 24/04
2019/0306184 A1 10/2019 Oliner et al.
2020/0034745 A1* 1/2020 Nagpal .................. G06N 5/022
2020/0084087 A1* 3/2020 Sharma ................. H04W 24/08
2020/0128441 A1* 4/2020 Singh .................... H04W 72/23
2020/0128446 A1 4/2020 Singh et al.
2021/0037400 A1* 2/2021 Yao ....................... H04W 24/04
2021/0219157 A1* 7/2021 Yao ....................... H04W 24/08
2021/0383271 A1* 12/2021 Slinger .................. G06N 20/20
2022/0303884 A1* 9/2022 Chen ..................... H04W 76/00
2023/0284186 A1* 9/2023 Negm ................. H04L 41/0806 370/329

OTHER PUBLICATIONS

Guo, Tian et al.; “Exploring Interpretable LSTM Neural Networks over Multi-Variable Data”; *2019 International Conference on Machine Learning*; May 28, 2019; pp. 1-17; vol. 1; ArXiv.org, Cornell University; Ithaca, NY, USA.
Lakkaraju, Himabindu et al.; “Interpretable Decision Sets: A Joint Framework for Description and Prediction”; *Proceedings of the 22nd ACM SIGKDD International Conference on Knowledge Discovery and Data Mining*; Aug. 13, 2016; pp. 1675-1684; ACM Publications; New York, NY, USA.
Oreshkin, Boris N. et al.; “N-BEATS: Neural Basis Expansion Analysis for Interpretable Time Series Forecasting”; *2020 International Conference on Learning Representations*; Feb. 20, 2020; pp. 1-31; vol. 4; ArXiv.org, Cornell University; Ithaca, NY, USA.

* cited by examiner

METHOD AND NETWORK DEVICE FOR DETERMINING CAUSES OF NETWORK SLICE PERFORMANCE DEGRADATION IN AN OPEN RADIO ACCESS NETWORK, O-RAN

CROSS REFERENCE TO RELATED APPLICATIONS

This application is a U.S. National Phase application under 35 U.S.C. § 371 of International Application No. PCT/EP2021/060085, filed on Apr. 19, 2021. The International Application was published in English on Oct. 27, 2022 as WO 2022/223094 A1 under PCT Article 21(2).

FIELD

The present invention relates to a computer-implemented method and a network device for determining causes of network slice performance degradation in an open radio access network, O-RAN, the O-RAN being under Central Unit-Distributed Unit, CU-DU, functional split.

BACKGROUND

As a central role of a 5G network, a network slice is an isolated E2E virtualized network fulfilling diverse requirements requested by a network tenant for particular network services. It can be deployed in different network domains (RAN, Edge, Cloud and Core). For 5G network and beyond, a virtualized substrate network often contains a massive number of network slices from different network tenants. Embodiments of the present invention facilitates the network operators to manage the performance of each network slice in the Open Radio Access Network (O-RAN) with CU/DU functional split in order to guarantee the agreed service levels in SLA (Service Level Agreement).

SLA violation is critical for network operators, since it is directly related to quality of network service and satisfactory of network slice tenants. When network performance degradation happens, the operators aim to early detect it and identify possible causes in order to avoid SLA violation.

The problem addressed by embodiments of the present invent is to proactively find the root cause(s) of potential performance degradation, such as E2E slice latency, for CU/DU (centralized unit—distributed unit) of Open RAN (radio access network) so as to guarantee the agreed service levels.

US 2019/0306184 A1 discloses a method for detecting anomalies in a time series using values of a different time series. The method includes obtaining sequences of time series values determined from machine data, wherein each sequence corresponds to a respective time series. A plurality of predictive models is generated for a first time series from the sequences of time series values. Each predictive model is to generate predicted values associated with the first time series using values of a second time series. For each of the plurality of predictive models, an error is determined between the corresponding predicted values and values associated with the first time series. A predictive model is selected for anomaly detection based on the determined error of the predictive model.

US 2020/0128446 A1 discloses a method for service aware coverage degradation detection and root cause identification. The coverage degradation is detected based on learned performance models and if degradation is forecasted, the root cause is identified. For the identification of root cause, firstly different throughputs are calculated through different performance models and the difference of throughput is identified. Further, the values are compared to certain thresholds to identify root cause.

SUMMARY

In an embodiment, the present disclosure provides a computer-implemented method for determining causes of network slice performance degradation in an open radio access network (O-RAN), the O-RAN being under Central Unit-Distributed Unit (CU-DU) functional split, the method including: in a setup phase: obtaining telemetries that contain multivariate observations of DUs, aggregating, per CU per network slice, telemetry data obtained from involved DUs, extracting, for a specific time slot, high order features from correlations between the multivariate observations across the involved DUs, and based on the telemetries and the extracted high order features, learning a k-time slots ahead performance prediction model; and in a detection phase: using, upon receiving new telemetries, the performance prediction model to forecast the network slice performance, based on a performance degradation being forecasted, sampling a set of performance prediction models and computing impact scores based on gradients of all telemetries and the extracted high order features using the sampled performance prediction models, and selecting telemetries and high order features with impact scores exceeding a configurable threshold and identifying network slice entities related to the selected telemetries as root causes of the forecasted performance degradation. The method can be applied to various use cases in artificial intelligence (AI) and machine learning (ML), such as in medical/healthcare or autonomous driving, to optimize load distribution or support decision making.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
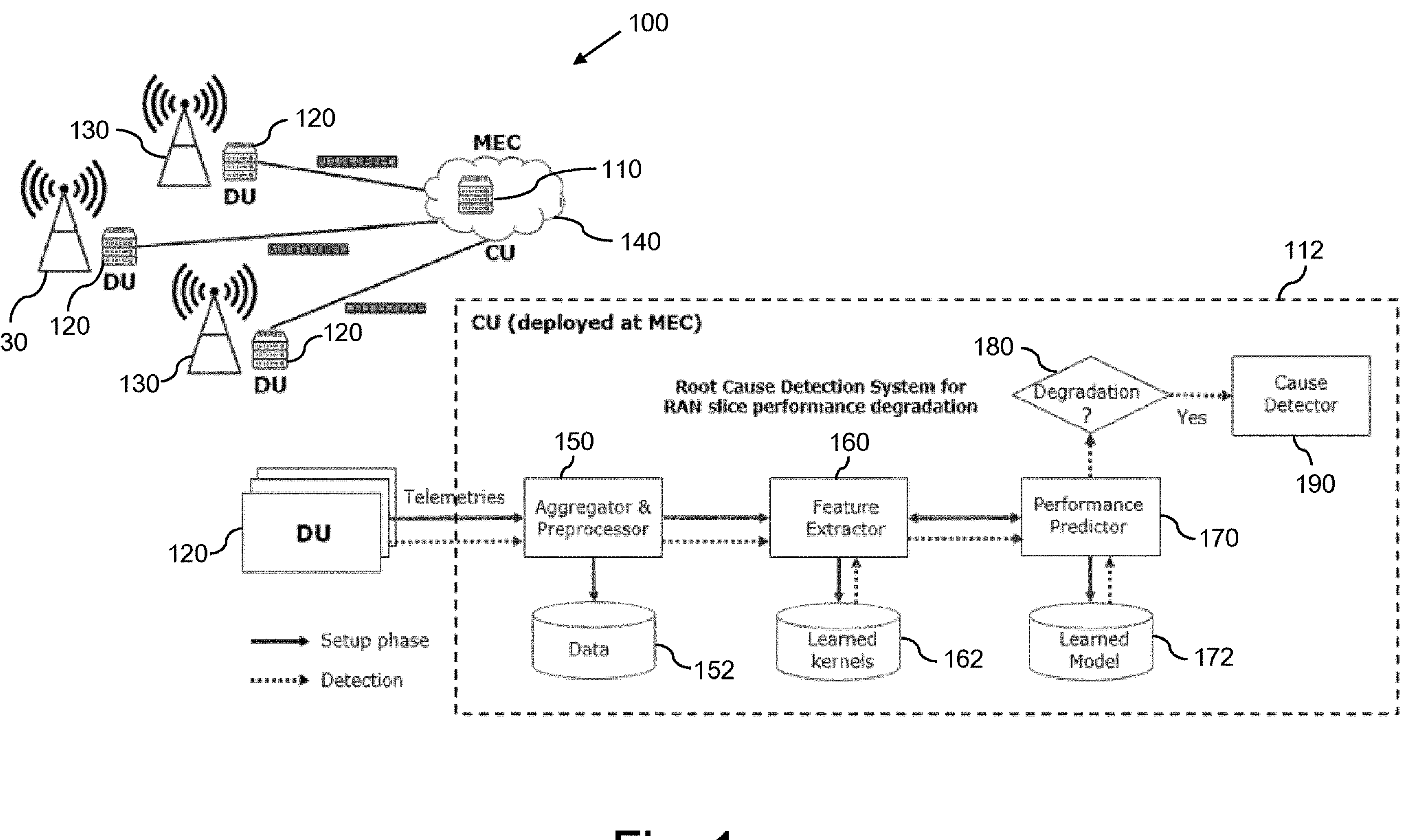
FIG. 1 is a schematic view illustrating a system for determining causes of network slice performance degradation in an open radio access network, O-RAN, according to an embodiment of the invention.

The project leading to this application has received funding from the European Union's Horizon 2020 research and innovation programme under grant agreement No 871780.

In accordance with an embodiment, the present invention improves and further develops a computer-implemented method and a network device of the initially described type in such a way that an efficient, robust and early determination of root cause(s) of potential performance degradation is enabled to support proactive prevention of SLA violations.

In accordance with another embodiment, the present invention provides a computer-implemented method for determining causes of network slice performance degradation in an open radio access network, O-RAN, the O-RAN being under Central Unit-Distributed Unit, CU-DU, functional split, the method comprising:

in a setup phase:

obtaining telemetries that contain multivariate observations of DUs, aggregating, per CU per network slice, the telemetry data obtained from the involved DUs, extracting, for a specific time slot, high order features from correlations between the multivariate observations across the involved DUs, and based on the telemetries and the extracted high order features, learning a k-time slots ahead performance prediction model; and in a detection phase:

using, upon receiving new telemetries, the performance prediction model to forecast the network slice performance, if a performance degradation is forecasted, sampling a set of performance prediction models and computing impact scores based on gradients of all telemetries and the extracted high order features using the sampled performance prediction models, and selecting telemetries and high order features with impact scores exceeding a configurable threshold and identifying the network slice entities related to the selected telemetries as the root causes of the potential performance degradation.

Furthermore, in accordance with an embodiment, the present invention provides a network device for determining causes of network slice performance degradation in an open radio access network, O-RAN, the O-RAN being under Central Unit-Distributed Unit, CU-DU, functional split, the network device comprising a functional unit having one or more computational processors with access to memory, which, alone or in combination, are configured to provide for execution of the following steps:

in a setup phase:

obtaining telemetries that contain multivariate observations of DUs, aggregating, per CU per network slice, the telemetry data obtained from the involved DUs, extracting, for a specific time slot, high order features from correlations between the multivariate observations across the involved DUs, and based on the telemetries and the extracted high order features, learning a k-time slots ahead performance prediction model; and in a detection phase:

using, upon receiving new telemetries, the performance prediction model to forecast the network slice performance, if a performance degradation is forecasted, sampling a set of performance prediction models and computing impact scores based on gradients of all telemetries and the extracted high order features using the sampled performance prediction models, and selecting telemetries and high order features with impact scores exceeding a configurable threshold and identifying the network slice entities related to the selected telemetries as the root causes of the potential performance degradation.

The present invention proposes a solution to proactively detect possible causes of network slice performance degradation (e.g. E2E slice latency) for CU/DU of open RAN through robust explainable time series forecasting. In particular, according to embodiments of the invention high order features are extracted from telemetry time series of the relevant network entities, dynamic patterns between the network slice performance and the telemetries are learned, and finally impact indicators of the telemetries and the high order features are crafted based on averaged gradients of sampled sequence models to identify the causes of the performance degradation perceptively. As such, the present invention provides an efficient and robust solution to proactively prevent SLA violation. The carefully crafted indicators are able to detect causes of potential network slice performance degradation for early reactions.

According to embodiments, the present invention relates to a method for detecting causes of network slice performance degradation using time-series data. The method is divided into two phases: a setup phase and a detection phase. In the setup phase, high order correlations between multiple observations across DUs are extracted and a performance prediction model is learned using a CNN (Convolutional Neural Network) based component and kernels working on high-order features. The end result of the setup phase is the learned performance prediction model and the root causes of performance degradation based on high-order features. In the detection phase, new input telemetries are received and the learned performance prediction model is used to anticipate the network slice performance. If the network slice performance is forecasted to degrade, then the root cause of the degradation is identified. According to an embodiment, the root cause is identified based on a dropout-based sampling method, wherein a set of performance prediction models are generated by randomly dropping out parameters following binomial distributions. Further, the gradient is computed for the performance prediction models with respect to telemetries, and impact scores are computed based on gradients of all the telemetries and the crafted high order features using the sampled prediction models. Telemetries having highest impact score are detected/identified as the root cause of performance degradation.

According to an embodiment, it may be provided that the multivariate observations of DUs contained in the obtained telemetries of DUs include, e.g., traffic per transmission/reception point (TRP), channel quality indicator, and Multiple Input Multiple Output (MIMO) usage rate and other telemetries related to the SLA of interest. As will be appreciated by those skilled in the art, further observations not mentioned above may be contained in the obtained telemetries. It will be understood that the specific observations contained in the obtained telemetries may be adapted based on the respective application scenario and operation purpose.

According to an embodiment, the high order features extraction may be performed by means of a CNN based component with multiple kernels with nonlinear activation functions. In this context, it may be provided that each kernel defines a functional relationship between the observations contained in the obtained telemetries of the DUs. By stacking multiple kernels with nonlinear activation functions, it is possible to obtain high-order hierarchical features.

According to an embodiment, sampling the set of performance prediction models may be performed by means of a dropout based sampling method. For instance, it may be provided to randomly drop out some parameters of a performance prediction model learned with training data. By using dropout based sampling, resistance against model uncertainty can be achieved, which is advantageous as the performance prediction model heavily relies on model parameters.

According to an embodiment, it may be provided that, for each sampled performance prediction model, the gradient is computed as a partial derivative of the prediction function of the respective model with respect to telemetries.

According to a further embodiment, it may be provided that the impact score of a telemetry is computed, for each single telemetry of a DU at a particular time, as the mean of the product of sampled gradients and the telemetry itself.

According to embodiments, in case a certain network slice entity has been identified as the root cause of a potential performance degradation, it may be provided that the settings of the respective network slice entity are proactively changed to prevent SLA violations.

According to an embodiment, the functional unit may be locally deployed per CU per slice to pinpoint the root causes of potential RAN performance degradation. In particular, the functional unit may be implemented as a (virtual) network function.

According to a further embodiment, the functional unit may also be deployed as an extra functionality for a Near Real-Time RAN Intelligent Controller, Near-RT RIC, of the open radio access network, O-RAN.

There are several ways how to design and further develop the teaching of the present invention in an advantageous way. To this end, it is to be referred to the dependent claims on the one hand and to the following explanation of embodiments of the invention by way of example, illustrated by the figure on the other hand. In connection with the explanation of the embodiments of the invention by the aid of the figure, generally embodiments and further developments of the teaching will be explained. In the drawings.

The present invention addresses the problem of proactively finding the root causes of potential performance degradation, such as E2E (end-to-end) slice latency, for CU/DU (centralized unit—distributed unit) of Open RAN (radio access network) so as to guarantee the agreed service level, SLA. Embodiments of the invention implement a (virtual) network function locally deployed per CU per network slice to pinpoint the root causes of potential RAN performance degradation. Embodiments of the invention propose a robust explainable time series forecasting method to solve the above issue.

In the context of the present invention, it is noted that modern machine learning (including deep learning) has attracted considerable attention due to its brilliant successes in a variety of domains with diverse data modalities. Although it reports superior performance in prediction, clustering, reinforcement learning and other learning tasks, it often behaves like a black box. Learning to explain outputs of the machine learning methods is thus highly demanded in many practical applications, especially in the domains of, e.g. healthcare and autonomous driving, where the cost and damage due to overconfident predictions are sensitive.

As in many industrial areas, such as networking, self-driving cars and IoT systems, the data is often in the form of multivariate time series, techniques for explainable time series forecasting are needed to meet heterogeneous service requirements. However the commonly used explainable AI methods, i.e. rule based methods as described, e.g., in H. Lakkaraju et al.: "Interpretable Decision Sets: A Joint Framework for Description and Prediction", in *Proceedings of the 22nd ACM SIGKDD International Conference on Knowledge Discovery and Data Mining*, August 2016, pages 1675-1684, https://doi.org/10.1145/2939672.2939874), do not apply any time series analysis due to the complexity of the data, which involves dynamic patterns of time stamped observations for an unknown lag length, and complicated relationships of multivariate observations at a single time slot.

It is further noted that attention based methods exist that are explored for explainable time series forecasting, as described, e.g., in T. Guo et al.: "Exploring Interpretable LSTM Neural Networks over Multi-Variable Data", arXiv: 1905.12034). The major concern is that attention computation may suffer from curse of dimensionality when investigated features and time lag are large. Additionally, the high order features crafted with original time series are not considered.

Most recently, B. N. Oreshkin et al.: "N-Beats: Neural Basis Expansion Analysis for Interpretable Time Series Forecasting", ICLR 2020 Conference Blind Submission, arXiv: 1905.10437) introduced an explainable AI method for time series analysis, but the focus is to find trend and periodicity of the time series under a neural network framework.

Generally, embodiments of the present invention relate to a gradient-based robust explainable time series forecasting method and system to detect causes of network slice performance degradation for CU/DU of O-RAN. More specifically, methods and systems according to embodiments of the invention are configured to extract high order features of multi-dimensional observations at a single time slot, and to learn a k-step ahead dynamic model to predict future outputs. A set of prediction models is generated by sampling the learned model. According to an embodiment, a set of sampled sequence models may be generated by using gradient-based sampling. The gradients of the sampled sequence model with respect to the original features are calculated and the automatically extracted high order features are used to carefully craft impact indicators/scores for cause explanation.

The proposed method is flexible to efficiently address any lag length and (high order) correlations between observations. Since it considers model uncertainty, it is more robust. The solution facilitates to detect root causes of network slice performance degradation for proactively preventing the potential SLA violations.

FIG. 1 is a schematic view illustrating the application of a method for determining causes of network slice performance degradation in an open radio access network, O-RAN 100, in accordance with an embodiment of the present invention. The RAN system 100 is under a functional split between the centralized unit, CU 110, on the one hand and the distributed units, DUs 120, on the other hand, i.e. the Baseband Unit, BBU, is decomposed into two functional components. While the DUs 120 may be collocated with the base stations 130 of the RAN 100, the CU 110 can be implemented in an automated multi-access edge computing, MEC, cloud 140. It should be noted that the general functionality of the present invention remains the same, regardless of where the functional DU-CU split is actually implemented (i.e. between which protocol layers). The proposed solution according to the present invention is implemented as a functional unit 112 that is locally deployed per CU 110 per slice, as shown in FIG. 1.

The pipeline of the functional unit 112 according to the embodiment shown in FIG. 1 includes a number of main components, which will be described hereinafter in detail.

Generally, the present invention includes a setup phase and a detection phase. In FIG. 1, the steps belonging to the setup phase are depicted by solid line arrows, while the steps belonging to the detection phase are depicted by dotted line arrows.

According to an embodiment, the setup phase includes the step of aggregating, per CU 110 per network slice, telemetries of the involved DUs 120 (i.e. the DUs 120 belonging to the respective CU 110) and preprocessing the data to the range of (−1,1). This step may be performed by an aggregator and preprocessor component 150, as shown in FIG. 1. The aggregated and preprocessed data may be stored at data repository 152. Furthermore, the setup phase may include the step of using a performance predictor component 170 to learn a dynamic prediction model 172 with automatically crafted high order features and telemetries generated by a feature extractor component 160, as will be described in more detail below.

In the detection phase, when receiving new telemetries from the DUs 120, the data may be first preprocessed to the range of (−1,1), i.e. in the same way as the training data in the setup phase. Next, the prediction model 172 learned in the setup phase may be used by the performance predictor component 170 to anticipate the network slice performance. If a performance degradation is forecasted at 180, then a cause detector component 190 may be invoked.

The cause detector component 190 may be configured to sample a set of models, for instance with a dropout based sampling method. Based on gradients of all telemetries and the crafted high order features impact scores may be computed using the sampled prediction models.

The cause detector component 190 may be further configured to select telemetries and high order features with large impact scores. For instance, this may be accomplished by either selecting a predefined number of telemetries and high order features with the highest resulting impact scores, or by selecting all telemetries and high order features having an impact score above a predefined threshold.

Finally, the cause detector component 190 may output the network slice entities (NSE) related to the selected telemetries as the root causes of the potential performance degradation. Based on these identified root causes, the settings of the respective NSE may be proactively changed, either automatically or with involvement of the network operator, to prevent SLA violations.

Next, the extraction of higher order correlations between multivariate observations across DUs 120 will be described in more detail.

DU specific observations $x_{i,t}=(x_{i,t}, \ldots, x_{i,t,D}) \in R^D$ at a time slot t are multi-dimensional. Here, i denotes the index of the DU, D is the dimensionality of the observations. Example observations include traffic per TRP (transmission/reception point), channel quality indicator (average quality of the radio link of the TRP), and MIMO (Multiple Input Multiple Output) usage rate (e.g., usage of MIMO full-rank spatial multiplexing). There could be complicated (high order) correlations between the observations. In general, the domain knowledge is used to pre-define the correlations, and to craft high order features. However, the domain knowledge is often missing, and generally incomplete in complicated applications, such as the RAN data. To enable automatically learning the high order features, the feature extractor component 160 may implement a CNN (Convolution Neural Network) based component, as exemplarily shown in FIG. 2.

Figure 2:
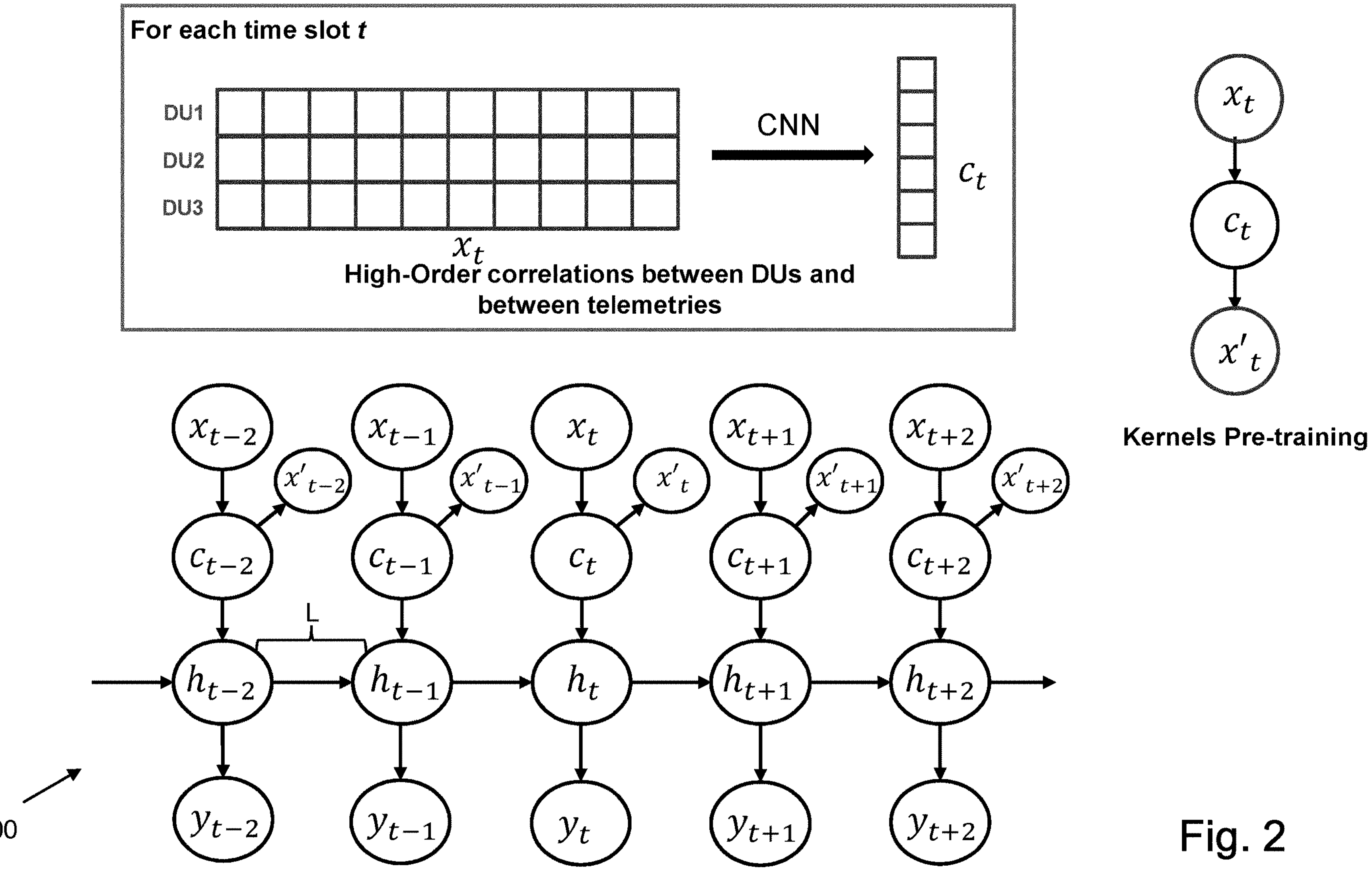
FIG. 2 is a schematic view illustrating the basic structure of a feature extractor component and a performance predictor component according to embodiments of the invention.

The CNN based component is responsible for extracting high-order features, i.e. patterns of telemetries, with multiple kernels. In the setup phase, the learned kernels may be stored in a learned kernel repository 162, from which they can be retrieved in the detection phase. Each kernel may define a functional relationship between the observations. Stacking multiple kernels with nonlinear activation functions will obtain high-order hierarchical features. In FIG. 2, the input of the CNN is denoted as $x_t=(x_{1,t}; \ldots, x_{N,t}) \in R^{N*D}$, which stack the observations of a number N of DUs, associating with the CU, at a time slot t. The input $x_t$ is a matrix of size N*D. The output of the CNN is denoted as $c_t$, which is a latent representation vector of the input.

$$x'_t$$

is the reconstructed input from the latent representation vector $c_t$. More details of the input reconstruction will be further introduced later.

When domain knowledge is available, e.g. two telemetries are linearly related $x_{t,1}=\omega x_{t,2}$ with a known coefficient, then a fixed kernel can be defined as $[1., -\omega]$. The high order feature, crafted with the kernel, may be used to analyze whether the real observations align with the rule. In addition, the data across DUs 120 often show some patterns. Given the structure explained above, the feature extractor component 160 can find such pattern as well.

According to an embodiment of the invention, the pipeline illustrated in FIG. 1 includes a data-driven component to find dynamic patterns of network slice performance. Generally, to find causes of network slice performance degradation, the dynamic relationship between DU specific telemetries and the network slice needs to be identified. To fulfill this goal, a data-driven method is designed as shown in FIG. 2. The inputs to the forecasting/prediction model are telemetries collected from DUs 120, e.g. traffic per TRP, channel quality indicator and MIMO usage rate. The outputs, generally denoted as $y_t$ in FIG. 2 are slice level performance, e.g. E2E slice latency and CPU resource consumption of a network slice.

According to an embodiment of the invention, the method implemented by the performance predictor component 170 may be implemented as a recurrent neural network, RNN 200, which may be configured as a k-step ahead forecasting model (i.e. k time windows ahead) that predicts slice performance based on telemetries of relevant DUs 120. $h_t$ denotes the output vector of each RNN cell at a time slot t. The length of the time window is L, which specifies how many time slots the RNN will look back when forecasting into the future. The value of L is defined by the data itself, for instance with a cross-validation method. A large time window means the long influence of the historic data to the future. FIG. 2 illustrates the window size L (L=4 in the figure as an example). The high order features extracted from the telemetries of multiple DUs 120 are viewed as inputs, stacked by a cell of the RNN 200 to find dynamic patterns.

In the training process, i.e. in the setup phase, kernels of extractors and parameters of cells of the RNN 200 may be simultaneously learned. This enables the feature extractor component 160 to identify the high order features towards better describing network slice performance. To make the training efficient, an encoder-decoder model may be used, as shown in FIG. 2, to pretrain the CNN kernels. The CNN is viewed as an encoder to encode the input data $x_t$ as a latent code vector $c_t$, and the decoder may be defined as a CNN with an inverse architecture of the encoder CNN.

$$x'_t$$

is the reconstructed input from the latent code $c_t$ with the decoder. In this way, the CNN kernels are enabled to find features to better reconstruct telemetries of different DUs 120.

Some network slice performance measurements are categorical variables, and are often highly imbalanced. A typical example is SLA violation, which is an important metric for the network operators, and directly reflects satisfactory of slice tenants. In general, the slice runs smoothly, so the variable SLA violation is negative. Consequently, only when some unexpected events (e.g. misbehavior of networking components) happen, the SLA can be violated. According to an embodiment of the invention that aims at solving this problem, negative sampling is used in the training procedure for statistically improving importance of the positive samples.

According to an embodiment of the invention, the cause detector component 190 illustrated in FIG. 1 may be configured to have a gradient-based operation, in order to achieve resistance against model uncertainty, as will be described hereinafter in more detail.

When new telemetries $x_T=(x_{1,T,1}, \ldots, x_{1,T,D}, \ldots, x_{N,T,D})$ arrive at the CU 110, the proposed CU-deployed functional unit 112 forecasts, by means of the performance prediction model learned as described above, slice performance for k time units into the future. If the performance predictor component 170 predicts a performance degradation, then, at 180, the cause detector component 190 is invoked to find the causes.

Since the prediction model heavily relies on model parameters, dropout based sampling may be used to compute scores resistant to model uncertainty. For each single telemetry $x_{i,T-\tau,j}$ of a DU i at a time T−τ, a corresponding impact score may be computed as mean of product of sampled gradients and the telemetry itself. The performance forecasting model is denoted as a function $f(x_T, \theta)$, where $f(\cdot)$ is defined with the neural network as described above in connection with FIG. 2, and θ are the learned parameters of this neural network.

Figure 3:
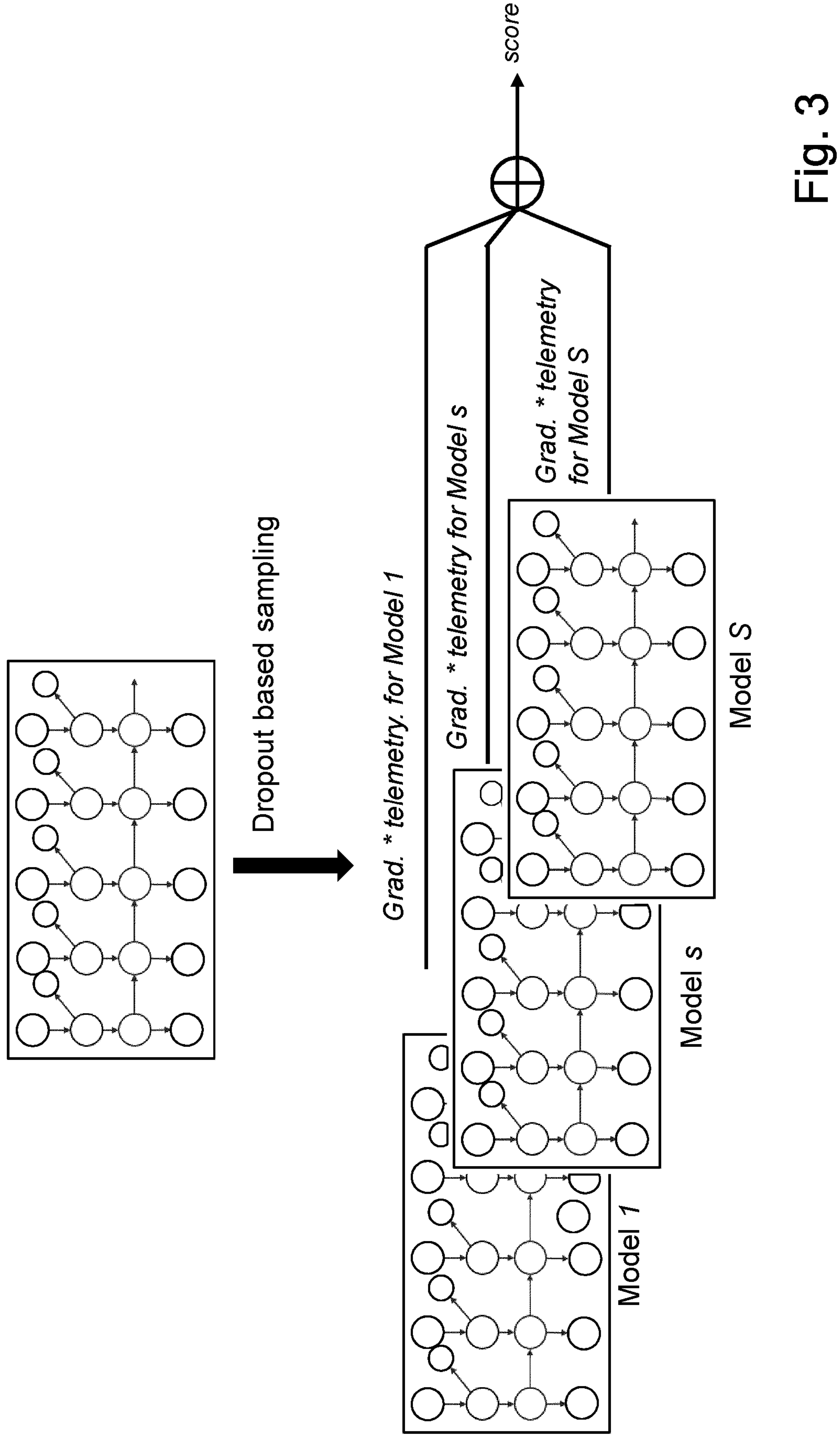
FIG. 3 is a schematic view illustrating the calculation of impact scores of telemetries according to an embodiment of the invention.

According to an embodiment of the invention the cause detector component 190 is configured to sample multiple forecasting models $f(x_T, \theta^{(s)})$ with a dropout based sampling method. For each sampled model, the cause detector component 190 computes the gradient as partial derivative of the function $f(x_T, \theta^{(s)})$ with respect to telemetries. This operation is schematically illustrated in FIG. 3, exemplary for a number S of sampled models (Model 1, . . . Model S). The larger the gradient is, the more extensive are the performance changes. The sign of the gradient specifies the direction of the change. While FIG. 3 illustrates the impact indicator/score computation for telemetries, it should be noted that the impact indicator/score for high order features may be computed equivalently. Given the scores of all telemetries and high order features, the causes that lead to the possible performance degradation can be identified.

According to embodiments of the invention, impact indicators of time-stamped VNF/PNF (Virtual Network Functions/Physical Network Functions) measurements are computed with normalized gradients of these variables for root cause detection of potential performance degradation. Generally, and specifically in this context, the following aspects should be noted:

(i) The larger the gradient of a time-stamped measurement is, the more likely it is the root cause of a predicted performance degradation.

(ii) According to an embodiment, the gradient is computed as the partial derivative of the network performance forecasting model with respect to a time-stamped measurement of a network function (VNF/PNF).

(iii) The normalization aims to remove the adverse influence of model uncertainty. In particular, it may be provided to sample multiple (e.g. 100) forecasting models with dropout-based sampling methods, i.e. by randomly dropping out some parameters of a forecasting model learned with training data, thereby getting average gradients as illustrated in FIG. 3.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for determining causes of network slice performance degradation in an open radio access network (O-RAN), the O-RAN being under Central Unit-Distributed Unit (CU-DU) functional split, the method comprising:

in a setup phase:

obtaining telemetries that contain multivariate observations of DUs, aggregating, per CU per network slice, telemetry data obtained from involved DUs, extracting, for a specific time slot, high order features from correlations between the multivariate observations across the involved DUs, and based on the telemetries and the extracted high order features, learning a k-time slots ahead performance prediction model; and in a detection phase:

using, upon receiving new telemetries, the performance prediction model to forecast the network slice performance, based on a performance degradation being forecasted, sampling a set of performance prediction models and computing impact scores based on gradients of all telemetries and the extracted high order features using the sampled performance prediction models, and selecting telemetries and high order features with impact scores exceeding a configurable threshold and identifying network slice entities related to the selected telemetries as root causes of the forecasted performance degradation.

2. The method according to claim 1, wherein the multivariate observations of DUs in the obtained telemetries of DUs include observations such as traffic per transmission/reception point (TRP), channel quality indicator, Multiple Input Multiple Output (MIMO) usage rate, and/or other telemetries related to SLA of interest.

3. The method according to claim 1, wherein the high order features extraction is performed by means of a CNN based component with multiple kernels with nonlinear activation functions, wherein each kernel defines a functional relationship between the multivariate observations.

4. The method according to claim 1, wherein sampling the set of performance prediction models is performed by applying a dropout based sampling method.

5. The method according to claim 1, further comprising:

computing, for each sampled performance prediction model of the set of performance prediction models, a gradient as a partial derivative of a prediction function of the respective performance prediction model with respect to telemetries.

6. The method according to claim 1, further comprising:

computing, for each single telemetry of a DU at a particular time, the impact score of the telemetry as a mean of the product of sampled gradients and the telemetry.

7. The method according to claim 1, further comprising, upon identifying a network slice entity as the cause of the performance degradation, proactively changing the settings of the respective network slice entity to prevent SLA violations.

8. A network device for determining causes of network slice performance degradation in an open radio access network (O-RAN), the O-RAN being under Central Unit-Distributed Unit (CU-DU) functional split, the network device comprising a functional unit having one or more computational processors with access to memory, which, alone or in combination, are configured to provide for execution of the following steps:

in a setup phase:

obtaining telemetries that contain multivariate observations of DUs, aggregating, per CU per network slice, telemetry data obtained from involved DUs, extracting, for a specific time slot, high order features from correlations between the multivariate observations across the involved DUs, and based on the telemetries and the extracted high order features, learning a k-time slots ahead performance prediction model; and in a detection phase:

using, upon receiving new telemetries, the performance prediction model to forecast the network slice performance, based on a performance degradation being forecasted, sampling a set of performance prediction models and computing impact scores based on gradients of all telemetries and the extracted high order features using the sampled performance prediction models, and selecting telemetries and high order features with impact scores exceeding a configurable threshold and identifying network slice entities related to the selected telemetries as root causes of the forecasted performance degradation.

9. The network device according to claim 8, wherein the functional unit includes a feature extractor component that is configured to perform the high order features extraction by means of a CNN based component with multiple kernels with nonlinear activation functions, wherein each kernel defines a functional relationship between the multivariate observations.

10. The network device according to claim 8, wherein the functional unit includes a root cause detection component that is configured to sample the set of performance prediction models by means of a dropout based sampling method.

11. The network device according to claim 10, wherein the root cause detection component is further configured to compute, for each single telemetry of a DU at a particular time, the impact score of the telemetry as a mean of a product of sampled gradients and the telemetry.

12. The network device according to claim 10, wherein the root cause detection component is further configured to compute, for each sampled performance prediction model, the gradient as a partial derivative of the prediction function of the respective model with respect to telemetries.

13. The network device according to claim 8, wherein the functional unit is locally deployed per CU per slice.

14. The network device according to claim 8, wherein the functional unit is deployed as an extra functionality for a Near Real-Time RAN Intelligent Controller (Near-RT RIC) of the open radio access network (O-RAN).

15. A non-transitory, computer-readable storage medium having instructions thereon which, upon execution on one or more processors, provide for execution of the following steps:

in a setup phase:

obtaining telemetries that contain multivariate observations of DUs of an open radio access network (O-RAN), the O-RAN being under Central Unit-Distributed Unit (CU-DU) functional split, aggregating, per CU per network slice, telemetry data obtained from involved DUS, extracting, for a specific time slot, high order features from correlations between the multivariate observations across the involved DUs, and based on the telemetries and the extracted high order features, learning a k-time slots ahead performance prediction model; and in a detection phase:

using, upon receiving new telemetries, the performance prediction model to forecast the network slice performance, based on a performance degradation being forecasted, sampling a set of performance prediction models and computing impact scores based on gradients of all telemetries and the extracted high order features using the sampled performance prediction models, and selecting telemetries and high order features with impact scores exceeding a configurable threshold and identifying network slice entities related to the selected telemetries as root causes of the forecasted performance degradation.

16. The method according to claim 1, wherein the high order features represent relations between one or more telemetries of the telemetry data and one or more DUs of the DUs.

* * * * *